Figure 1:
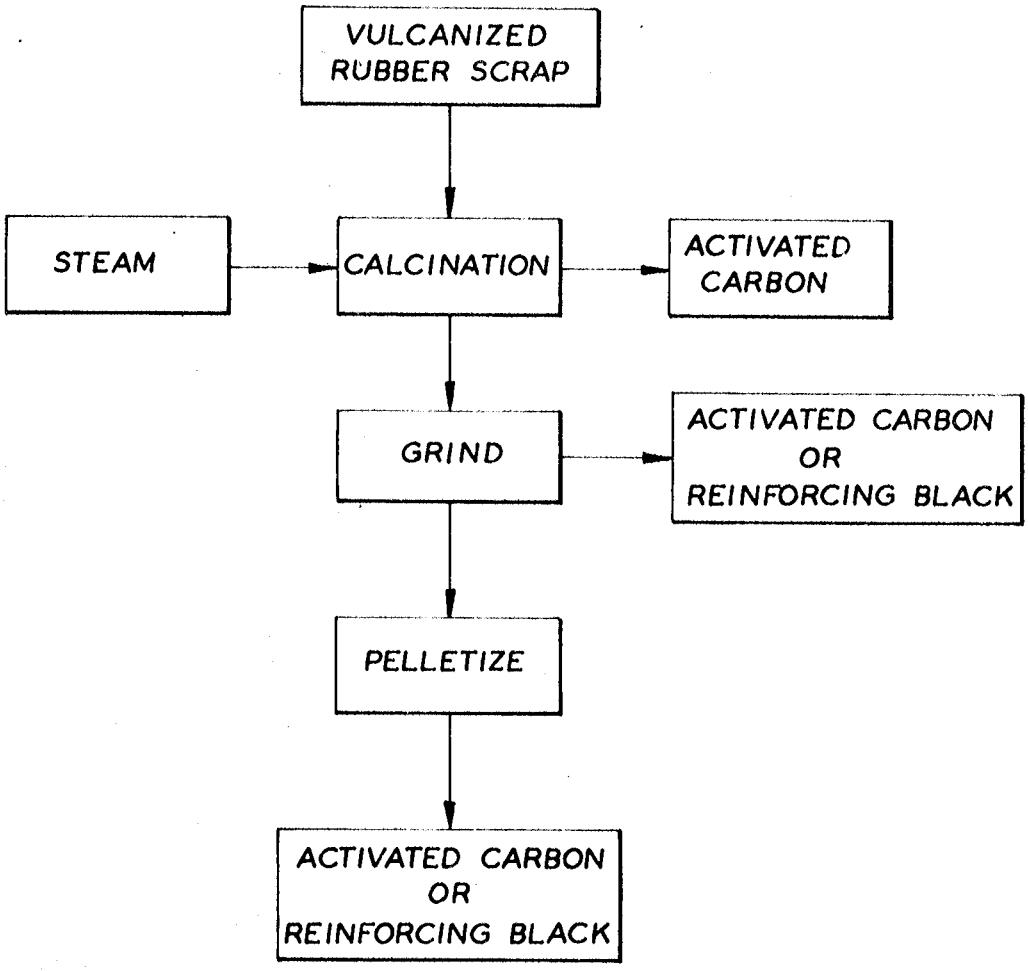
Figure 2:
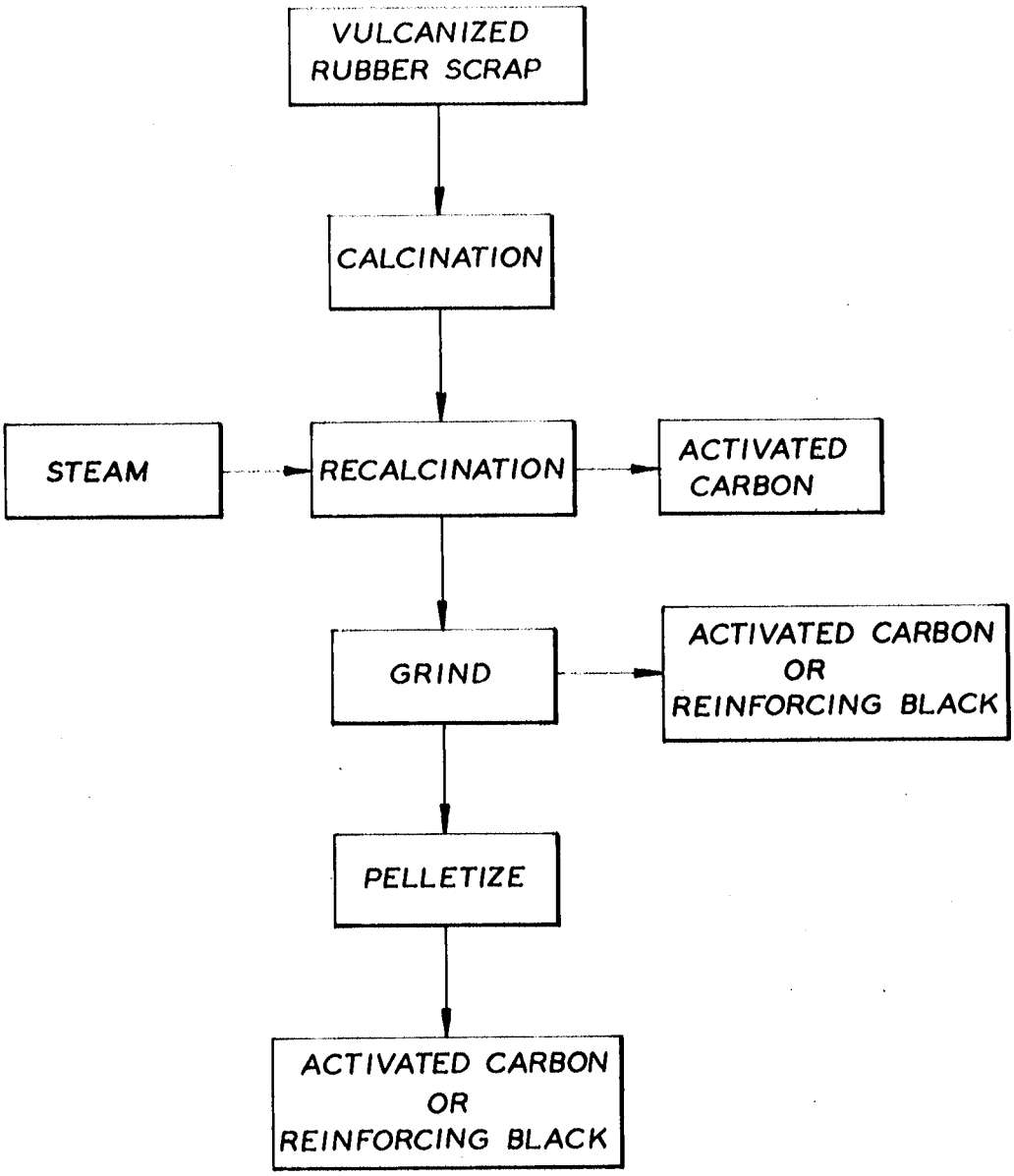
Figure 3:
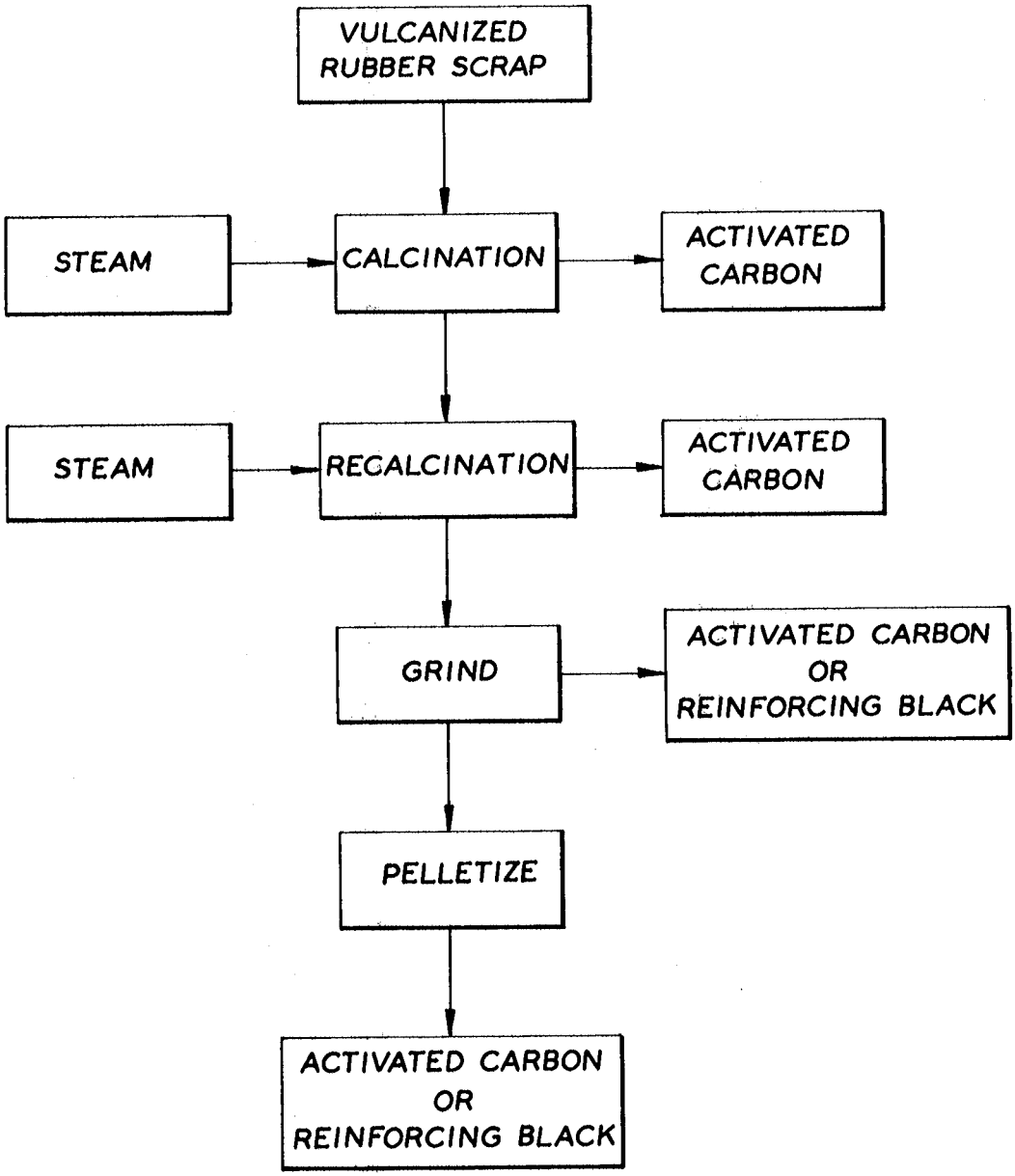

United States Defensive Publication [19] (H) [11] T965,002

Crane et al. [43] Dec. 6, 1977

[54] STEAM TREATMENT OF VULCANIZED-SCRAP-RUBBER PYROLYSIS CHAR

[75] Inventors: Grant Crane; Edward L. Kay, both of Akron, Ohio

[73] Assignee: The Firestone Tire & Rubber Company, Akron, Ohio

[21] Appl. No.: 766,834

[22] Filed: Feb. 7, 1977

Related U.S. Application Data

[63] Continuation of Ser. No. 709,030, July 27, 1976, abandoned, which is a continuation of Ser. No. 493,438, July 24, 1974, abandoned.

[51] Int. Cl.[2] ..... C01B 31/10; B01J 21/18

[52] U.S. Cl. ..... 252/421; 106/307; 201/2.5; 201/25; 252/445; 423/445; 423/449; 260/42.47; 260/763

[57] ABSTRACT

Scrap rubber is pyrolyzed in the substantial absence of air and treated with steam. The steam treatment can be carried out simultaneously with the pyrolysis or subsequently or it may be carried out both in part simultaneously with the pyrolysis and subsequently. Different products are obtained.

16 Claims, 3 Sheets Drawing,

18 Pages Specification

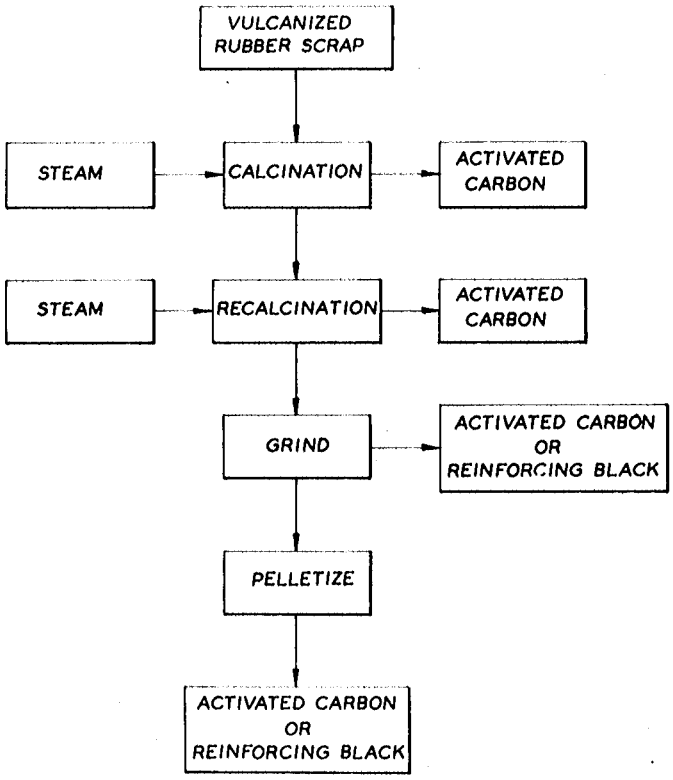

The file of this unexamined application may be inspected and copies thereof may be purchased (849 O.G. 1221, Apr. 9, 1968).